(12) United States Patent
Hirota et al.

(10) Patent No.: US 8,580,215 B2
(45) Date of Patent: Nov. 12, 2013

(54) EXHAUST GAS CONTROL APPARATUS AND METHOD FOR INTERNAL COMBUSTION ENGINE

(75) Inventors: Shinya Hirota, Susono (JP); Yoshinori Yamashita, Kakegawa (JP)

(73) Assignees: Toyota Jidosha Kabushiki Kaisha, Toyota (JP); Cataler Corporation, Kakegawa-Shi (JP)

( * ) Notice: Subject to any disclaimer, the term of this patent is extended or adjusted under 35 U.S.C. 154(b) by 0 days.

(21) Appl. No.: 13/636,925

(22) PCT Filed: Apr. 5, 2011

(86) PCT No.: PCT/IB2011/000734
§ 371 (c)(1),
(2), (4) Date: Sep. 24, 2012

(87) PCT Pub. No.: WO2011/124968
PCT Pub. Date: Oct. 13, 2011

(65) Prior Publication Data
US 2013/0017136 A1   Jan. 17, 2013

(30) Foreign Application Priority Data
Apr. 6, 2010  (JP) ................. 2010-087753

(51) Int. Cl.
| | |
|---|---|
| *B01D 53/56* | (2006.01) |
| *B01D 53/94* | (2006.01) |
| *F01N 3/10* | (2006.01) |
| *F01N 3/28* | (2006.01) |
| *G05B 1/00* | (2006.01) |

(52) U.S. Cl.
USPC ............... 423/212; 423/213.2; 423/DIG. 5; 422/105; 60/299; 60/301

(58) Field of Classification Search
USPC ................ 423/212, 213.2, DIG. 5; 422/105; 60/299, 301
See application file for complete search history.

(56) References Cited

U.S. PATENT DOCUMENTS

| | | |
|---|---|---|
| 6,713,030 B1 | 3/2004 | Chandler et al. |
| 2004/0098968 A1 | 5/2004 | van Nieuwstadt et al. |

(Continued)

FOREIGN PATENT DOCUMENTS

| | | |
|---|---|---|
| JP | A-2002-513110 | 5/2002 |
| JP | A-2003-293737 | 10/2003 |
| JP | A-2006-017115 | 1/2006 |
| JP | A-2008-280955 | 11/2008 |
| JP | A-2009-264181 | 11/2009 |
| WO | WO 99/55446 | 11/1999 |

OTHER PUBLICATIONS

Sep. 7, 2011 International Search Report issued in International Application No. PCT/IB2011/000734.

(Continued)

*Primary Examiner* — Timothy Vanoy
(74) *Attorney, Agent, or Firm* — Oliff & Berridge, PLC

(57) ABSTRACT

A NOx selective reduction catalyst for reducing NOx by the ammonia adsorbed is disposed in an engine exhaust gas passage. As states of adsorption of ammonia by the catalyst, there are a first adsorption state of ammonia that occurs when the ammonia is adsorbed during low temperature and a second adsorption state of ammonia that occurs when the ammonia is adsorbed or has already been adsorbed during high temperature. The amount of adsorbed ammonia in the first state is restricted to control concentration of the ammonia that is in the first state and desorbed when the temperature of the catalyst increases so as to be not higher than an allowable concentration, and that in the second state is restricted to control concentration of the ammonia that is in the second state and desorbed when the temperature of the catalyst increases so as to be not higher than an allowable concentration.

9 Claims, 7 Drawing Sheets

(56) References Cited

U.S. PATENT DOCUMENTS

| | | | |
|---|---|---|---|
| 2006/0000202 A1 | 1/2006 | Ripper et al. | |
| 2009/0288396 A1 | 11/2009 | Sakata et al. | |
| 2010/0028230 A1* | 2/2010 | Gady et al. | 423/239.1 |
| 2010/0057328 A1 | 3/2010 | Brown et al. | |
| 2011/0311420 A1* | 12/2011 | Perrin et al. | 423/213.2 |
| 2012/0000190 A1 | 1/2012 | Hirota et al. | |
| 2012/0141370 A1* | 6/2012 | Tokunaga | 423/700 |

OTHER PUBLICATIONS

Sep. 7, 2011 Written Opinion issued in International Application No. PCT/IB2011/000734.

Mar. 6, 2012 International Preliminary Report on Patentability issued in International Patent Application No. PCT/IB2011/000734.

Apr. 2, 2012 Office Action issued in Japanese Patent Application No. 2010-087753 (with partial translation).

* cited by examiner

FIG. 1
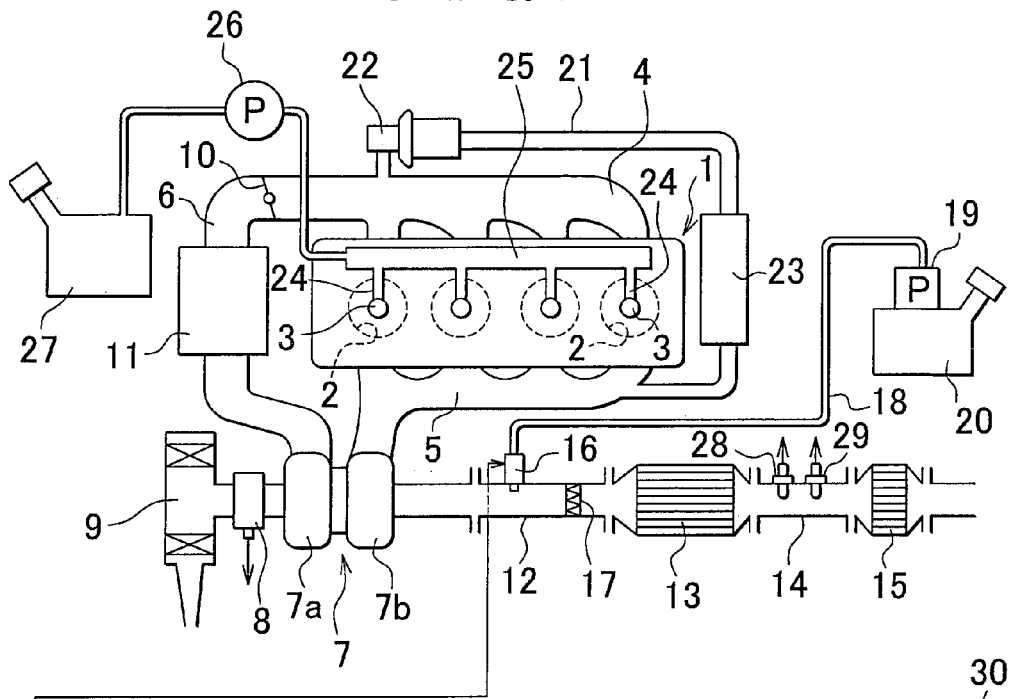
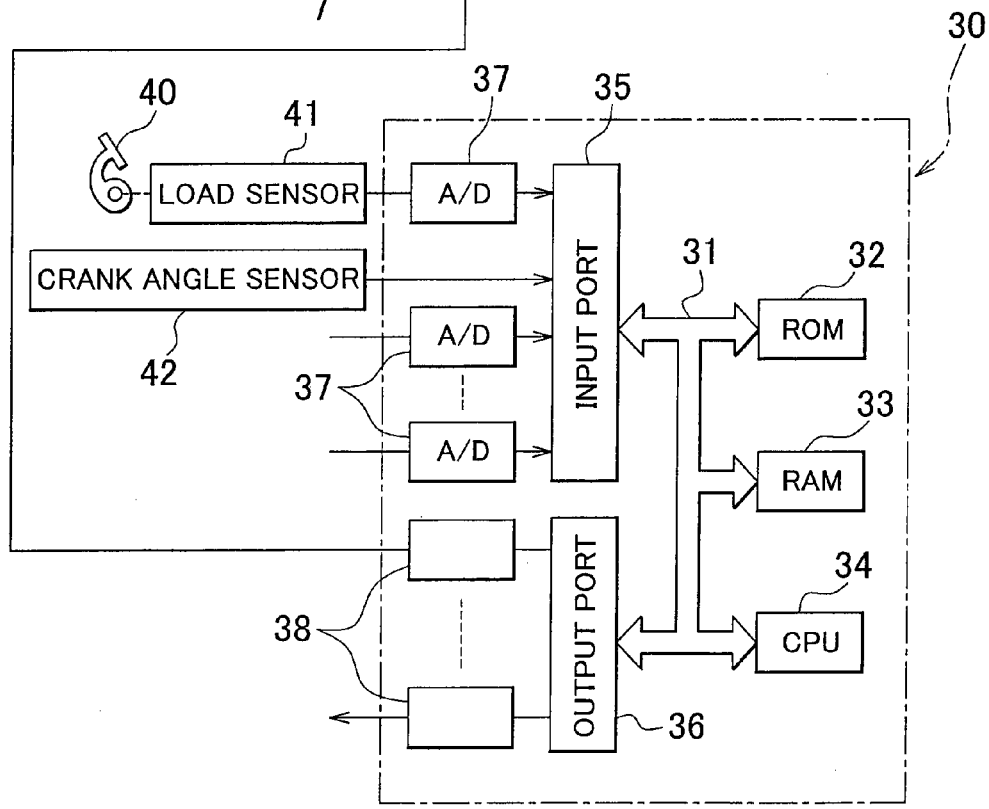

EXHAUST GAS CONTROL APPARATUS AND METHOD FOR INTERNAL COMBUSTION ENGINE

FIELD OF THE INVENTION

The invention relates to an exhaust gas control apparatus for an internal combustion engine and a method of controlling exhaust gas of an internal combustion engine.

DESCRIPTION OF RELATED ART

An internal combustion engine is available, in which a NOx selective reduction catalyst is disposed in an engine exhaust gas passage, aqueous urea solution is supplied to the NOx selective reduction catalyst to cause the NOx selective reduction catalyst to adsorb the ammonia produced from the aqueous urea solution, and NOx in exhaust gas is selectively reduced mainly using the ammonia adsorbed (see Japanese Patent Application Publication No. 2003-293737, for example). In the case where NOx is reduced by the adsorbed ammonia in this way, it is preferable that ammonia be adsorbed by the NOx selective reduction catalyst as much as possible in order to secure the preferable NOx reduction effect. Thus, in the above internal combustion engine, a target ammonia adsorption amount slightly less than the ammonia saturation adsorption amount is set in advance and the amount of aqueous urea solution supplied is controlled so that the amount of ammonia adsorbed by the NOx selective reduction catalyst is brought to the target ammonia adsorption amount.

However, as a result of diligent study of the adsorption of ammonia by the NOx selective reduction catalyst, it has been found that there are at least two ammonia adsorption states. Specifically, it has been found that there are a first adsorption state of ammonia that occurs if the ammonia is adsorbed by the NOx selective reduction catalyst while the temperature of the NOx selective reduction catalyst is in a lower side temperature range lower than, for example, 200° C., and the amount of desorption of ammonia in which state is maximized in the lower side temperature range as the temperature of the NOx selective reduction catalyst increases, and a second adsorption state of ammonia that occurs if the ammonia is adsorbed or has already been adsorbed by the NOx selective reduction catalyst while the temperature of the NOx selective reduction catalyst is in a higher side temperature range higher than, for example, 200° C., and the amount of desorption of ammonia in which state is maximized in the higher side temperature range as the temperature of the NOx selective reduction catalyst increases. In this case, NOx in the exhaust gas is reduced by the ammonia that is in one of these adsorption states.

In the meantime, with regard to the NOx selective reduction catalyst, the amount of ammonia that flows out of the NOx selective reduction catalyst can increase when the ammonia that is in the first adsorption state is desorbed or when the ammonia that is in the second adsorption state is desorbed. In order to reduce the amount of ammonia that flows out of the NOx selective reduction catalyst, it is required to suppress the amount of desorption of the ammonia that is in the first adsorption state or the amount of desorption of the ammonia that is in the second adsorption state, and therefore, it is required to control the amount of adsorbed ammonia that is in the first adsorption state and the amount of adsorbed ammonia that is in the second adsorption state.

In this case however, when the total amount of the adsorbed ammonia is controlled so as to be brought to the target adsorption amount as in the case of the above internal combustion engine, one of the amount of adsorbed ammonia that is in the first adsorption state and the amount of adsorbed ammonia that is in the second adsorption state can extremely increase. In such a case, when acceleration operation is performed, for example, and the temperature of the NOx selective reduction catalyst increases beyond the lower side temperature range, a large amount of ammonia that is in the first adsorption state is desorbed when the amount of adsorbed ammonia that is in the first adsorption state is extremely large and on the other hand, a large amount of ammonia that is in the second adsorption state is desorbed when the amount of adsorbed ammonia that is in the second adsorption state is extremely large. As a result, a problem can arise that a large amount of ammonia flows out of the NOx selective reduction catalyst.

SUMMARY OF THE INVENTION

In order to solve such a problem, it is required to control the amount of adsorbed ammonia that is in the first adsorption state and the amount of adsorbed ammonia that is in the second adsorption state and for this purpose, it is required to estimate the amount of adsorbed ammonia that is in the first adsorption state and the amount of adsorbed ammonia that is in the second adsorption state.

Thus, an aspect of the invention is an exhaust gas control apparatus for an internal combustion engine, in which a NOx selective reduction catalyst is disposed in an engine exhaust gas passage, ammonia is supplied to the NOx selective reduction catalyst to cause the NOx selective reduction catalyst to adsorb the ammonia, and NOx in exhaust gas is selectively reduced mainly using the ammonia adsorbed, the exhaust gas control apparatus being characterized in that: as states of adsorption of the ammonia by the NOx selective reduction catalyst, there are a first adsorption state of the ammonia that occurs if the ammonia is adsorbed by the NOx selective reduction catalyst while a temperature of the NOx selective reduction catalyst is in a lower side temperature range, and the amount of desorption of the ammonia in which state is maximized in the lower side temperature range as the temperature of the NOx selective reduction catalyst increases, and a second adsorption state of the ammonia that occurs if the ammonia is adsorbed or has already been adsorbed by the NOx selective reduction catalyst while the temperature of the NOx selective reduction catalyst is in a higher side temperature range higher than the lower side temperature range, and the amount of desorption of the ammonia in which state is maximized in the higher side temperature range as the temperature of the NOx selective reduction catalyst increases; and the amount of adsorbed ammonia that is in the first adsorption state is estimated to control the amount of adsorbed ammonia that is in the first adsorption state, and the amount of adsorbed ammonia that is in the second adsorption state is estimated to control the amount of adsorbed ammonia that is in the second adsorption state.

By estimating the amount of adsorbed ammonia that is in the first adsorption state and the amount of adsorbed ammonia that is in the second adsorption state, it is possible to control the amount of adsorbed ammonia that is in the first adsorption state and the amount of adsorbed ammonia that is in the second adsorption state, which makes it possible to suppress the amount of ammonia that flows out of the NOx selective reduction catalyst.

The above aspect of the invention may be configured such that, in order to control a first concentration, which is the concentration of the ammonia that is desorbed from the first adsorption state when the temperature of the NOx selective reduction catalyst increases, so as to be equal to or lower than a predetermined, first allowable concentration, the amount of adsorbed ammonia that is in the first adsorption state is restricted based on the estimated amount of adsorbed ammonia that is in the first adsorption state, and in order to control a second concentration, which is the concentration of the ammonia that is desorbed from the second adsorption state when the temperature of the NOx selective reduction catalyst increases, so as to be equal to or lower than a predetermined, second allowable concentration, the amount of adsorbed ammonia that is in the second adsorption state is restricted based on the estimated amount of adsorbed ammonia that is in the second adsorption state.

The above aspect of the invention may be configured such that: a first target ammonia adsorption amount for controlling the first concentration so as to be equal to or lower than the predetermined, first allowable concentration, is set in advance; a second target ammonia adsorption amount for controlling the second concentration so as to be equal to or lower than the predetermined, second allowable concentration, is set in advance; and the amount of ammonia supplied is controlled so that the amount of adsorbed ammonia that is in the first adsorption state is kept equal to or less than the first target ammonia adsorption amount and the amount of adsorbed ammonia that is in the second adsorption state is kept equal to or less than the second target ammonia adsorption amount.

The above aspect of the invention may be configured such that: a main target ammonia adsorption amount for the entire amount of adsorbed ammonia that is in the first adsorption state or the second adsorption state is set in Advance; each of the first target ammonia adsorption amount and the second target ammonia adsorption amount is set to a value less than the main target ammonia adsorption amount at the same temperature of the NOx selective reduction catalyst; and the amount of ammonia supplied is controlled so that the entire amount of adsorbed ammonia is brought to the main target ammonia adsorption amount while keeping the amount of adsorbed ammonia that is in the first adsorption state equal to or less than the first target ammonia adsorption amount and keeping the amount of adsorbed ammonia that is in the second adsorption state equal to or less than the second target ammonia adsorption amount.

The above aspect of the invention may be configured such that the temperature of the NOx selective reduction catalyst is increased to change the adsorption state of the ammonia that is in the first adsorption state to the second adsorption state when an estimated value of the amount of adsorbed ammonia that is in the first adsorption state approaches the first target ammonia adsorption amount and exceeds a predetermined, first adsorption amount determination value and an estimated value of the amount of adsorbed ammonia that is in the second adsorption state is lower than a predetermined, second adsorption amount determination value.

The above aspect of the invention may be configured such that the consumption of the adsorbed ammonia that is the amount of adsorbed ammonia that is consumed to reduce NOx is calculated when the amount of adsorbed ammonia that is in the first adsorption state and the amount of adsorbed ammonia that is in the second adsorption state are estimated.

The above aspect of the invention may be configured such that the change amount of adsorbed ammonia that is the amount of adsorbed ammonia, the adsorption state of which changes from the first adsorption state to the second adsorption state when the temperature of the NOx selective reduction catalyst increases is estimated, and based on an estimated value of the change amount of adsorbed ammonia, an estimated value of the amount of adsorbed ammonia that is in the first adsorption state and an estimated value of the amount of adsorbed ammonia that is in the second adsorption state are corrected.

The above aspect of the invention may be configured such that the amount of adsorbed ammonia that is in the first adsorption state and the amount of adsorbed ammonia that is in the second adsorption state are estimated based on the amount of ammonia supplied to the NOx selective reduction catalyst, a NOx reduction rate of the NOx selective reduction catalyst, and the temperature of the NOx selective reduction catalyst.

Another aspect of the invention is a method of controlling exhaust gas of an internal combustion engine, characterized by including: supplying ammonia to a NOx selective reduction catalyst, disposed in an engine exhaust gas passage, to cause the NOx selective reduction catalyst to adsorb the ammonia; and selectively reducing NOx in exhaust gas using the ammonia adsorbed, wherein, as states of adsorption of the ammonia by the NOx selective reduction catalyst, there are a first adsorption state of the ammonia that occurs if the ammonia is adsorbed by the NOx selective reduction catalyst while a temperature of the NOx selective reduction catalyst is in a lower side temperature range, and the amount of desorption of the ammonia in which state is maximized in the lower side temperature range as the temperature of the NOx selective reduction catalyst increases, and a second adsorption state of the ammonia that occurs if the ammonia is adsorbed or has already been adsorbed by the NOx selective reduction catalyst while the temperature of the NOx selective reduction catalyst is in a higher side temperature range higher than the lower side temperature range, and the amount of desorption of the ammonia in which state is maximized in the higher side temperature range as the temperature of the NOx selective reduction catalyst increases, and the method further includes: estimating the amount of adsorbed ammonia that is in the first adsorption state; controlling the amount of adsorbed ammonia that is in the first adsorption state based on the estimated amount of adsorbed ammonia that is in the first adsorption state; estimating the amount of adsorbed ammonia that is in the second adsorption state; and controlling the amount of adsorbed ammonia that is in the second adsorption state based on the estimated amount of adsorbed ammonia that is in the second adsorption state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 shows an overall diagram of a compression ignition internal combustion engine;

DETAILED DESCRIPTION OF EMBODIMENTS

Figure 2:
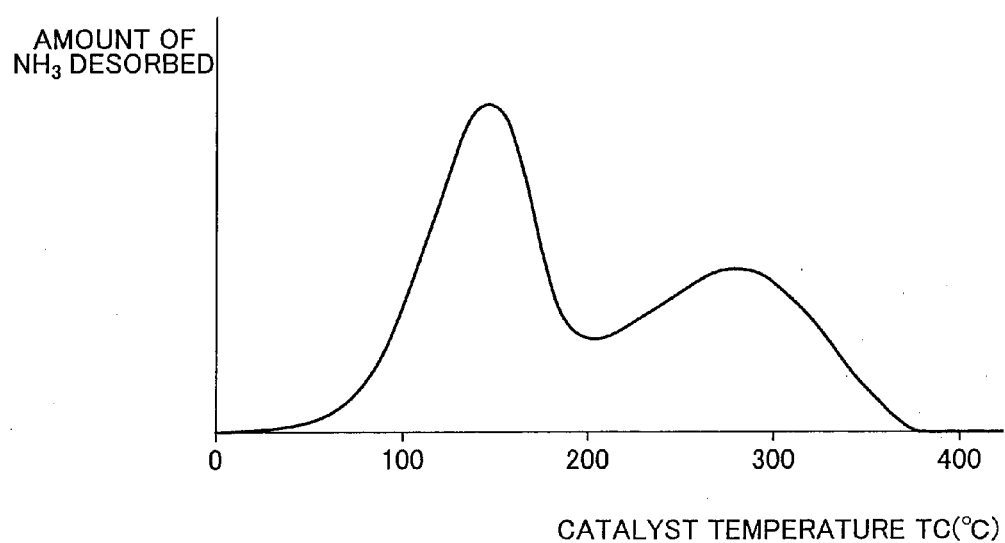
FIG. 2 is a diagram showing the amount of desorption of ammonia.

FIG. 1 shows an overall diagram of a compression ignition internal combustion engine. Referring to FIG. 1, the reference numeral 1 denotes an engine body, the reference numerals 2 denote combustion chambers of respective cylinders, the reference numerals 3 denote electronically controlled fuel injection valves that inject fuel into the respective combustion chambers 2, the reference numeral 4 denotes an intake manifold, and the reference numeral 5 denotes an exhaust manifold. The intake manifold 4 is connected to the exit of a compressor 7a of an exhaust gas turbocharger 7 via an air intake duct 6, and the entrance of the compressor 7a is connected to an air cleaner 9 via an intake air amount detector 8. A throttle valve 10 that is driven by a step motor is disposed in the air intake duct 6, and a cooling device 11 that cools the intake air flowing through the air intake duct 6 is disposed around the air intake duct 6. In an embodiment shown in FIG. 1, engine coolant is introduced into the cooling device 11 and cools the intake air.

On the other hand, the exhaust manifold 5 is connected to the entrance of an exhaust gas turbine 7b of the exhaust gas turbocharger 7, and the exit of the exhaust gas turbine 7b is connected to the entrance of a NOx selective reduction catalyst 13 via an exhaust pipe 12. The exit of the NOx selective reduction catalyst 13 is connected to an oxidation catalytic converter 15 via an exhaust pipe 14, and an aqueous urea solution supply valve 16 is disposed in the exhaust pipe 12 upstream of the NOx selective reduction catalyst 13. A diffusion plate 17 that diffuses the aqueous urea solution is disposed in the exhaust pipe 12 downstream of the aqueous urea solution supply valve 16, which is connected to an aqueous urea solution tank 20 via a supply pipe 18 and a supply pump 19. The aqueous urea solution stored in the aqueous urea solution tank 20 is injected via the supply pump 19 from the aqueous urea solution supply valve 16 into the exhaust gas flowing through the exhaust pipe 12, and the NOx in the exhaust gas is reduced in the NOx selective reduction catalyst 13 by ammonia that is produced from urea ($(NH_2)_2CO + H_2O \rightarrow 2NH_3 + CO_2$).

The exhaust manifold 5 and the intake manifold 4 are connected to each other via an exhaust gas recirculation (hereinafter referred to as "EGR") passage 21 and an electronically controlled EGR control valve 22 is disposed in the EGR passage 21. A cooling device 23 that cools the EGR gas flowing through the EGR passage 21 is disposed around the EGR passage 21. In the embodiment shown in FIG. 1, the engine coolant is introduced into the cooling device 23 and cools the EGR gas. The fuel injection valves 3 are connected to a common rail 25 via fuel supply pipes 24, and the common rail 25 is connected to a fuel tank 27 via an electronically controlled, variable delivery fuel pump 26. The fuel stored in the fuel tank 27 is supplied into the common rail 25 via the fuel pump 26 and the fuel supplied into the common rail 25 is supplied to the fuel injection valves 3 via the fuel supply pipes 24.

An electronic control unit 30 is a digital computer, which includes a read only memory (ROM) 32, a random access memory (RAM) 33, a microprocessor (CPU) 34, an input port 35, and an output port 36, which are connected to each other via a bidirectional bus 31. A NOx sensor 28 that detects the concentration of NOx in the exhaust gas and a temperature sensor 29 that detects the temperature of the exhaust gas are disposed in the exhaust pipe 14 downstream of the NOx selective reduction catalyst 13, and the signals output from the NOx sensor 28, the temperature sensor 29, and the intake air amount detector 8 are input to the input port 35 via corresponding analogue-to-digital (AD) converters 37, respectively.

On the other hand, a load sensor 41 that generates an output voltage proportional to the amount of depression, L, of an accelerator pedal 40 is connected to the accelerator pedal 40 and the output voltage from the load sensor 41 is input to the input port 35 via the corresponding AD converter 37. In addition, a crank angle sensor 42 that generates an output pulse at every 15-degree rotation, for example, of a crank shaft is connected to the input port 35. On the other hand, the output port 36 is connected to the fuel injection valves 3, the step motor for driving the throttle valve 10, the aqueous urea solution supply valve 16, the supply pump 19, the EGR control valve 22, and the fuel pump 26.

In the embodiment shown in FIG. 1, the NOx selective reduction catalyst 13 includes Fe-zeolite that adsorbs ammonia and exhibits high performance in removing NOx. In addition, the oxidation catalytic converter 15 carries catalyst containing noble metal, such as platinum, and oxidizes the ammonia that escapes from the NOx selective reduction catalyst 13.

As described above, a study conducted by the present inventors has revealed that as the states of adsorption of ammonia by the NOx selective reduction catalyst 13, there are a first adsorption state of ammonia that occurs if the ammonia is adsorbed by the NOx selective reduction catalyst 13 while the temperature of the NOx selective reduction catalyst 13 is in a predetermined lower side temperature range, and the amount of desorption of ammonia in which state is maximized in the lower side temperature range as the temperature of the NOx selective reduction catalyst 13 increases, and a second adsorption state of ammonia that occurs if the ammonia is adsorbed or has already been adsorbed by the NOx selective reduction catalyst 13 while the temperature of the NOx selective reduction catalyst 13 is in a predetermined higher side temperature range higher than the lower side temperature range, and the amount of desorption of ammonia in which state is maximized in the higher side temperature range as the temperature of the NOx selective reduction catalyst 13 increases.

FIG. 2 shows an experimental example that proves this fact. This experimental result shows the amount of ammonia desorbed when the temperature TC of the NOx selective reduction catalyst is gradually increased after causing the NOx selective reduction catalyst to sufficiently adsorb ammonia ($NH_3$). In this experimental example, the above-described predetermined temperature of the NOx selective reduction catalyst is approximately 200° C., the lower side temperature range is lower than 200° C., and the higher side temperature range is equal to or higher than 200° C. Ammonia that is adsorbed while the temperature is in the lower side temperature range lower than 200° C. is in the first adsorption state. Ammonia that is adsorbed or has already been adsorbed while the temperature is in the higher side temperature range equal to or higher than 200° C. is in the second adsorption state.

As shown in FIG. 2, as the temperature TC of the NOx selective reduction catalyst increases, two peaks of the amount of desorbed ammonia appear. The first peak appears in the lower side temperature range and the second peak appears in the higher side temperature range. If ammonia is adsorbed or has already been adsorbed by the NOx selective reduction catalyst while the temperature of the NOx selective reduction catalyst is in the higher side temperature range equal to or higher than 200° C., the ammonia is in a stable state, that is, in the second adsorption state. It is considered that, when ammonia is brought into the stable, second adsorption state, the bond between ammonia and the NOx selective reduction catalyst is strengthened and the ammonia desorption temperature is higher than that in the case of the first adsorption state and therefore, as shown in FIG. 2, the amount of desorption of ammonia that is in the second adsorption state is maximized in the higher side temperature range.

NOx in the exhaust gas is mainly reduced by reacting with the desorbed ammonia when the ammonia adsorbed by the NOx selective reduction catalyst 13 is desorbed. When the ammonia is adsorbed at relatively higher temperatures, the reducing power of the ammonia with respect to NOx is stronger than that when ammonia is adsorbed at relatively lower temperatures. As described above, when the temperature of the NOx selective reduction catalyst 13 is in the higher side temperature range, the ammonia is adsorbed at relatively higher temperatures, that is, the ammonia is in the second adsorption state and therefore has a strong reducing power with respect to NOx.

On the other hand, when the temperature of the NOx selective reduction catalyst 13 is in the higher side temperature range, NOx in the exhaust gas reacts, on the catalyst, with the ammonia that is desorbed from the NOx selective reduction catalyst 13. In this case, even when ammonia is desorbed from the NOx selective reduction catalyst 13, if the amount of the desorbed ammonia is not so greater than the amount of ammonia required to reduce NOx, there is no fear that a large amount of ammonia escapes from the NOx selective reduction catalyst 13.

On the other hand, the ammonia that is adsorbed by the NOx selective reduction catalyst 13 while the temperature of the NOx selective reduction catalyst 13 is in the lower side temperature range is hardly activated when the ammonia is desorbed, which means that the ammonia is in the first adsorption state. However, when the temperature of the NOx selective reduction catalyst 13 is in the lower side temperature range, the ammonia that is in the second adsorption state is also present on the NOx selective reduction catalyst 13 in an adsorbed state. Specifically, it has been confirmed through experiments that, when the temperature of the NOx selective reduction catalyst 13 is temporarily increased into the higher side temperature range so as to adsorb ammonia in a stable state, and then the supply of ammonia is stopped and the temperature of the NOx selective reduction catalyst 13 is reduced into the lower side temperature range, ammonia continues to be adsorbed in the stable state even when the temperature of the NOx selective reduction catalyst 13 is in the lower side temperature range. In other words, it has been confirmed through experiments that, once the ammonia adsorbed is stabilized, that is, brought into the second adsorption state, the stable, second adsorption state is maintained even when the temperature of the NOx selective reduction catalyst 13 is brought into the lower side temperature range.

Thus, when the temperature of the NOx selective reduction catalyst 13 is in the lower side temperature range, ammonia that is in the first adsorption state and ammonia that is in the second adsorption state both are present on the NOx selective reduction catalyst 13 in an adsorbed state. In this case, the ammonia that is in the second adsorption state is stronger in the reducing power with respect to NOx when the ammonia is desorbed than the ammonia that is in the first adsorption state and therefore, the NOx reduction rate when the temperature of the NOx selective reduction catalyst 13 is in the lower side temperature range depends on the ratio between the amount of ammonia that is in the first adsorption state and the amount of ammonia that is in the second adsorption state.

The ammonia that is adsorbed when the temperature of the NOx selective reduction catalyst 13 is in the lower side temperature range and is hardly activated when the ammonia is desorbed, that is, the ammonia that is in the first adsorption state, is desorbed from the NOx selective reduction catalyst 13 when the temperature of the NOx selective reduction catalyst 13 increases. The amount of desorption of the ammonia is maximized when the temperature of the NOx selective reduction catalyst 13 is in the lower side temperature range as shown in FIG. 2. In this case, NOx in the exhaust gas hardly reacts with the ammonia that is desorbed from the first adsorption state, so that the ammonia passes through the NOx selective reduction catalyst 13 without reaction. The ammonia that has passed through the NOx selective reduction catalyst 13 without reaction is oxidized in the oxidation catalytic converter 15. However, when the amount of ammonia is large or the oxidation catalytic converter 15 is not sufficiently activated, a large amount of ammonia is discharged into the atmosphere.

On the other hand, when acceleration operation is performed, for example, and the temperature of the NOx selective reduction catalyst 13 rapidly increases, the ammonia that is in the second adsorption state is desorbed all at once near the catalyst temperature TC in the higher side temperature range, at which the amount of $NH_3$ desorbed reaches a peak in FIG. 2. When the amount of ammonia that is in the second adsorption state is large, the ammonia that is desorbed is much larger than the amount of ammonia that is consumed to reduce NOx, so that a large amount of ammonia passes through the NOx selective reduction catalyst 13 without reaction and is discharged into the atmosphere.

In order to prevent such a large amount of ammonia from being discharged into the atmosphere, it is necessary to control the amount of desorption of ammonia that is in the first adsorption state, and in addition, it is necessary to control the amount of desorption of ammonia that is in the second adsorption state. Thus, in the invention, the amount of adsorbed ammonia that is in the first adsorption state is estimated to control the amount of adsorbed ammonia that is in the first adsorption state, and the amount of adsorbed ammonia that is in the second adsorption state is estimated to control the amount of adsorbed ammonia that is in the second adsorption state.

What causes a problem in relation to the discharge of ammonia into the atmosphere is the concentration of the ammonia discharged and what is actually required is to control the concentration of the discharged ammonia so as to make the concentration equal to or lower than a predetermined allowable concentration. In this invention, therefore, in order to control the concentration of the ammonia that is desorbed from the first adsorption state when the temperature of the NOx selective reduction catalyst 13 increases so as to be equal to or lower than the predetermined allowable concentration, the amount of adsorbed ammonia that is in the first adsorption state is restricted based on the estimated amount of adsorbed ammonia that is in the first adsorption state; in addition, in order to control the concentration of the ammonia that is desorbed from the second adsorption state when the temperature of the NOx selective reduction catalyst 13 increases so as to be equal to or lower than the predetermined allowable concentration, the amount of adsorbed ammonia that is in the second adsorption state is restricted based on the estimated amount of adsorbed ammonia that is in the second adsorption state.

More specifically, in the invention, a first target ammonia adsorption amount for controlling the concentration of the ammonia that is desorbed from the first adsorption state when the temperature of the NOx selective reduction catalyst 13 increases so as to be equal to or lower than the predetermined allowable concentration, is set in advance, and the amount of aqueous urea solution, that is, the amount of ammonia, supplied from the aqueous urea solution supply valve 16 is controlled so that the amount of adsorbed ammonia that is in the first adsorption state does not exceed the first target ammonia adsorption amount. In addition, in the invention, a second target ammonia adsorption amount for controlling the concentration of the ammonia that is desorbed from the second adsorption state when the temperature of the NOx selective reduction catalyst 13 increases so as to be equal to or lower than the predetermined allowable concentration, is set in advance, and the amount of aqueous urea solution, that is, the amount of ammonia, supplied from the aqueous urea solution supply valve 16 is controlled so that the amount of adsorbed ammonia that is in the second adsorption state does not exceed the second target ammonia adsorption amount.

Figure 3:
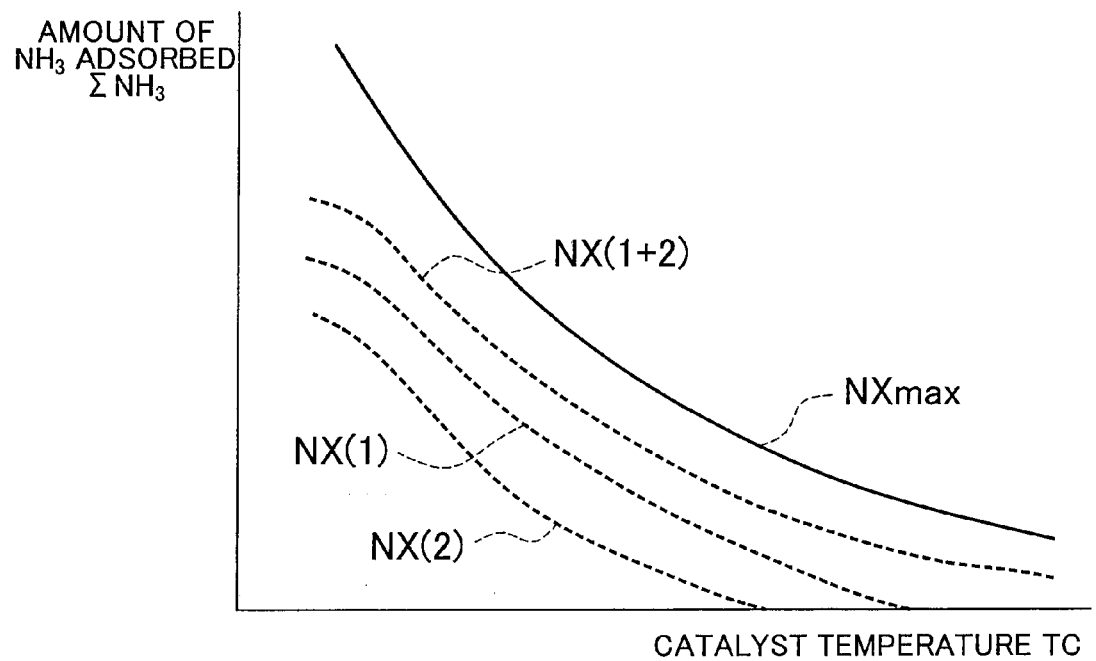
FIG. 3 is a diagram showing target ammonia adsorption amounts according to the invention.

Next, with reference to FIG. 3, the first target ammonia adsorption amount and the second target ammonia adsorption amount will be described. The horizontal axis in FIG. 3 indicates the temperature TC of the NOx selective reduction catalyst 13 and the vertical axis in FIG. 3 indicates the amount of ammonia, $\Sigma NH_3$, that is adsorbed by the NOx selective reduction catalyst 13. Referring to FIG. 3, $NX_{max}$ indicates the amount of ammonia adsorbed by the NOx selective reduction catalyst 13 that is saturated, that is, the saturation adsorption amount. As can be seen from FIG. 3, the saturation adsorption amount $NX_{max}$ of ammonia increases as the catalyst temperature TC decreases.

In this embodiment of the invention, as shown by the broken lines in FIG. 3, a main target ammonia adsorption amount NX(1+2) for the entire amount of adsorbed ammonia that is in the first adsorption state or the second adsorption state is set in advance, and in addition, the first target ammonia adsorption amount NX(1) for the amount of adsorbed ammonia that is in the first adsorption state and the second target ammonia adsorption amount for the amount of adsorbed ammonia that is in the second adsorption state are set in advance. The first target ammonia adsorption amount NX(1) is the target ammonia adsorption amount for controlling the concentration of the ammonia that is desorbed from the first adsorption state so as to be equal to or lower than the predetermined allowable concentration, and the second target ammonia adsorption amount NX(2) is the target ammonia adsorption amount for controlling the concentration of the ammonia that is desorbed from the second adsorption state so as to be equal to or lower than the predetermined allowable concentration.

As can be seen from FIG. 3, the main target ammonia adsorption amount NX(1+2) is set to the amount of desorbed ammonia $\Sigma NH_3$ that is slightly less than the saturation adsorption amount $NX_{max}$ at any catalyst temperature TC. On the other hand, the first target ammonia adsorption amount NX(1) is set to a value less than the main target ammonia adsorption amount NX(1+2) at the same catalyst temperature TC. The second target ammonia adsorption amount NX(2) is also set to a value less than the main target ammonia adsorption amount NX(1+2) at the same catalyst temperature TC.

As described above, NOx in the exhaust gas is mainly reduced by reacting with the adsorbed ammonia that is desorbed from the NOx selective reduction catalyst 13. In this case, however, the ammonia originating from the adsorbed ammonia that is in the second adsorption state is stronger in the reducing power with respect to NOx than the ammonia originating from the adsorbed ammonia that is in the first adsorption state. In other words, the reducing power with respect to NOx of the adsorbed ammonia that is in the first adsorption state is not so strong. However, even in the case of the adsorbed ammonia that is in the first adsorption state, the greater the amount of adsorption is, the stronger the reducing power thereof with respect to NOx is. Thus, the main target ammonia adsorption amount NX(1+2) for the entire amount of adsorbed ammonia that is in the first adsorption state or the second adsorption state is set to be as close as possible to the ammonia saturation adsorption amount $NX_{max}$, and basically, the amount of aqueous urea solution supplied, that is, the amount of ammonia supplied is controlled so that the entire amount of adsorbed ammonia is brought to the main target ammonia adsorption amount NX(1+2).

However, when the amount of adsorbed ammonia that is in the first adsorption state exceeds the first target ammonia adsorption amount NX(1), the concentration of desorbed ammonia exceeds the allowable concentration and for this reason, the amount of adsorbed ammonia that is in the first adsorption state is controlled so as not to exceed the first target ammonia adsorption amount NX(1). When the amount of adsorbed ammonia that is in the second adsorption state exceeds the second target ammonia adsorption amount NX(2), the concentration of desorbed ammonia exceeds the allowable concentration and for this reason, the amount of adsorbed ammonia that is in the second adsorption state is also controlled so as not to exceed the second target ammonia adsorption amount NX(2). Specifically, in this embodiment of the invention, the amount of aqueous urea solution supplied, that is, the amount of ammonia supplied is controlled so that the entire amount of adsorbed ammonia is brought to the main target ammonia adsorption amount NX(1+2) while keeping the amount of adsorbed ammonia that is in the first adsorption state equal to or less than the first target ammonia adsorption amount NX(1) and keeping the amount of adsorbed ammonia that is in the second adsorption state equal to or less than the second target ammonia adsorption amount NX(2).

In this embodiment of the invention, the amount of aqueous urea solution supplied is controlled based on the estimated value of the amount of adsorbed ammonia. Specifically, in this embodiment of the invention, the amount of adsorbed ammonia that is in the first adsorption state and the amount of adsorbed ammonia that is in the second adsorption state are estimated and based on the estimated value of the amount of adsorbed ammonia that is in the first adsorption state and the estimated value of the amount of adsorbed ammonia that is in the second adsorption state, the amount of aqueous urea solution supplied, that is, the amount of ammonia supplied is controlled.

Next, referring to FIG. 4, a method of estimating the amount of adsorbed ammonia will be described. In this embodiment of the invention, the estimated value, $\Sigma NH_3(1)_n$, of the amount of adsorbed ammonia that is in the first adsorption state and the estimated value, $\Sigma NH_3(2)_n$, of the amount of adsorbed ammonia that is in the second adsorption state are repeatedly calculated at predetermined time intervals using the following expressions: $\Sigma NH_3(1)_n \leftarrow \Sigma NH_3(1)_{n-1} + Q_1 - M_1 - F \ldots (1)$; and $\Sigma NH_3(2)_n \leftarrow \Sigma NH_3(2)_{n-1} + Q_2 - M_2 + F \ldots (2)$.

In the above expression (1), $\Sigma NH_3(1)_{n-1}$ represents the estimated value, calculated in the preceding calculation, of the amount of adsorbed ammonia that is in the first adsorption state, $Q_1$ represents the amount of the adsorbed ammonia that is the ammonia added within a period between the preceding calculation and the current calculation and adsorbed in the first adsorption state, and $M_1$ represents the consumption of adsorbed ammonia that is the amount of the adsorbed ammonia that was in the first adsorption state and has been consumed to reduce NOx within the period between the preceding calculation and the current calculation.

On the other hand, in the above expression (2), $\Sigma NH_3(2)_{n-1}$ represents the estimated value, calculated in the preceding calculation, of the amount of adsorbed ammonia that is in the second adsorption state, $Q_2$ represents the amount of the adsorbed ammonia that is the ammonia added within the period between the preceding calculation and the current calculation and adsorbed in the second adsorption state, and $M_2$ represents the consumption of adsorbed ammonia that is the amount of the adsorbed ammonia that was in the second adsorption state and has been consumed to reduce NOx within the period between the preceding calculation and the current calculation.

In the above expressions (1) and (2), F represents the amount of adsorbed ammonia that has changed from the first adsorption state to the second adsorption state within the period between the preceding calculation and the current calculation.

First, $Q_1$ and $Q_2$ will be explained. If ammonia is added by the amount of addition, Q, within the period between the preceding calculation and the current calculation, the ammonia is adsorbed by the NOx selective reduction catalyst 13 in one of the first adsorption state and the second adsorption state depending on the temperature TC of the NOx selective reduction catalyst 13. FIG. 4B shows the proportion of the amount of adsorbed ammonia, $Q_1$, that is adsorbed in the first adsorption state by $N_1$, and the proportion of the amount of adsorbed ammonia, $Q_2$, that is adsorbed in the second adsorption state by $N_2$. $N_1$ and $N_2$ herein satisfy the expression, $N_1+N_2=1.0$.

When the catalyst temperature TC is in the lower side temperature range lower than 200° C., for example, most of the ammonia added is adsorbed in the first adsorption state, so that $N_1$ is greater than $N_2$ in the lower side temperature range as shown in FIG. 4B. When the catalyst temperature TC is in the higher side temperature range equal to or higher than 200° C., for example, most of the ammonia added is adsorbed in the second adsorption state, so that $N_2$ is greater than $N_1$ in the higher side temperature range as shown in FIG. 4B.

The relations between the catalyst temperature TC and $N_1$ and $N_2$ shown in FIG. 4B are stored in the ROM 32 in advance, and the amount of ammonia, $Q_1$ ($=N_1 \cdot Q$), that is adsorbed in the first adsorption state and the amount of ammonia, $Q_2$ ($=N_2 \cdot Q$), that is adsorbed in the second adsorption state are calculated based on the relations.

Next, $M_1$ in the above expression (1) and $M_2$ in the above expression (2) will be described. In the embodiment of the invention, the NOx reduction rate R of the NOx selective reduction catalyst 13 is calculated from a concentration, Din, of NOx in the exhaust gas that flows into the NOx selective reduction catalyst 13 and a concentration, Dout, of NOx in the exhaust gas that flows out of the NOx selective reduction catalyst 13. In this case, in the embodiment of the invention, the amount of NOx, NOXA, that is discharged from the engine per unit time is stored in the ROM 32 in advance as a function of engine load L and engine speed N in the form of a map shown in FIG. 4A, the NOx concentration Din is calculated from the NOx amount NOXA and an intake air amount GA, and the NOx concentration Dout is calculated from the output of the NOx sensor 28.

Once the NOx reduction rate R is obtained, the total consumption of the adsorbed ammonia consumed to reduce NOx within the period between the preceding calculation and the current calculation can be calculated based on the discharged NOx amount NOXA and the NOx reduction rate. In actuality, NOx is reduced by the adsorbed ammonia that is in the first adsorption state and the adsorbed ammonia that is in the second adsorption state and therefore, the sum of the consumption $M_1$ of the adsorbed ammonia that is in the first adsorption state and the consumption $M_2$ of the adsorbed ammonia that is in the second adsorption state is the total consumption of the adsorbed ammonia.

Note that as described above, in this case, the ammonia originating from the adsorbed ammonia that is in the second adsorption state is stronger in the reducing power with respect to NOx than the ammonia originating from the adsorbed ammonia that is in the first adsorption state, and the amount of desorption, due to increase in temperature, of the adsorbed ammonia that is in the first adsorption state is greater than that of the adsorbed ammonia that is in the second adsorption state. In the embodiment of the invention, the ratio, $\eta_1 : \eta_2$, between the ammonia consumption $M_1$ and the ammonia consumption $M_2$ is determined through experiments in advance.

Next, F in the above expressions (1) and (2) will be described. When the temperature TC of the NOx selective reduction catalyst 13 increases, the state of part of the adsorbed ammonia that is in the first adsorption state changes to the second adsorption state. When the rate of change is represented by a change coefficient $\sigma$, the change amount F of the adsorbed ammonia that is the amount of adsorbed ammonia, the state of which changes to the second adsorption state, is a value ($F=\sigma \cdot \Sigma NH_3(1)_{n-1}$) that is obtained by multiplying the ammonia adsorption amount $\Sigma NH_3(1)_{n-1}$ that is the amount of adsorbed ammonia in the first adsorption state, calculated in the preceding calculation, by the change coefficient $\sigma$.

Figure 4A:
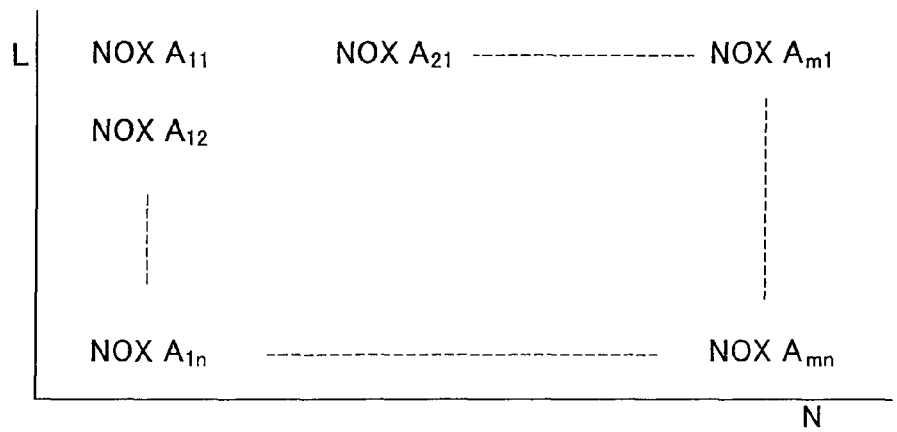
FIG. 4A is a diagram showing a map of the amount of NOx, NOXA, that is discharged from an engine.
Figure 4B:
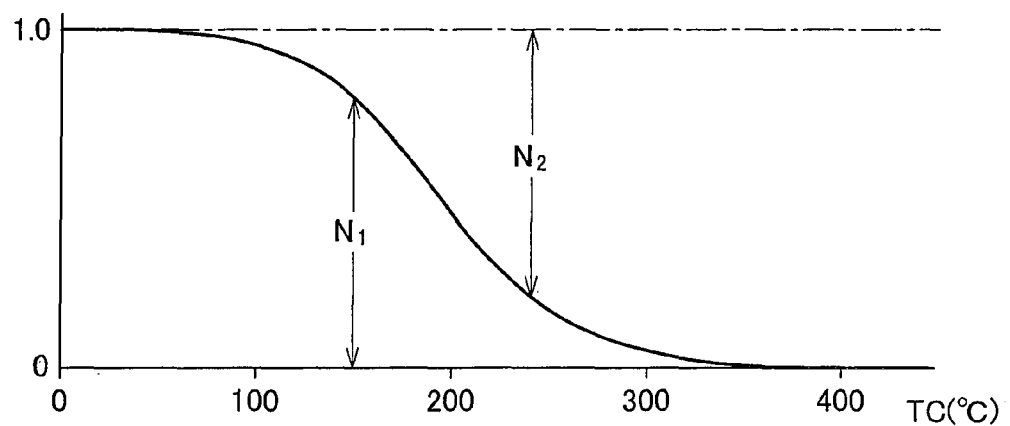
FIG. 4B is a diagram showing the proportion, $N_1$, of the amount of adsorbed ammonia that is adsorbed in the first adsorption state and the proportion, $N_2$, of the amount of adsorbed ammonia that is adsorbed in the second adsorption state.
Figure 4C:
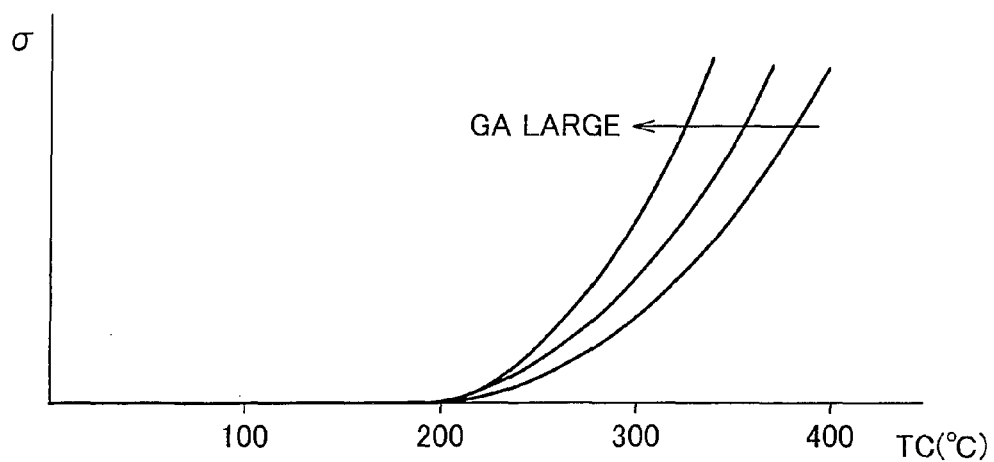
FIG. 4C is a diagram showing relations between change coefficient σ and catalyst temperature TC as well as intake air amount GA.

The change coefficient $\sigma$ is a function of the temperature TC of the NOx selective reduction catalyst 13 and the intake air amount GA as shown in FIG. 4C. Specifically, as shown in FIG. 4C, when the catalyst temperature TC is in the higher side temperature range, the change coefficient $\sigma$ increases as the catalyst temperature TC increases. When the intake air amount GA increases, that is, when the flow speed of the exhaust gas increases, a large amount of ammonia or urea that is adsorbed by the NOx selective reduction catalyst 13 at an upstream end portion thereof is diffused toward the downstream side and the amount of activated ammonia increases, so that the change coefficient $\sigma$ increases as the intake air amount GA increases when the catalyst temperature TC is the same, as shown in FIG. 4C. The relations between the change coefficient $\sigma$ and the catalyst temperature TC as well as the intake air amount GA shown in FIG. 4C are stored in the ROM 32 in advance.

As described above, in the embodiment of the invention, the change amount F of the adsorbed ammonia that is the amount of adsorbed ammonia, the state of which changes from the first adsorption state to the second adsorption state when the temperature TC of the NOx selective reduction catalyst 13 increases is estimated, and based on the estimated value F of the change amount of the adsorbed ammonia, the estimated value $\Sigma NH_3(1)_n$ of the amount of adsorbed ammonia that is in the first adsorption state and the estimated value $\Sigma NH_3(2)_n$ of the amount of adsorbed ammonia that is in the second adsorption state are corrected.

Figure 5:
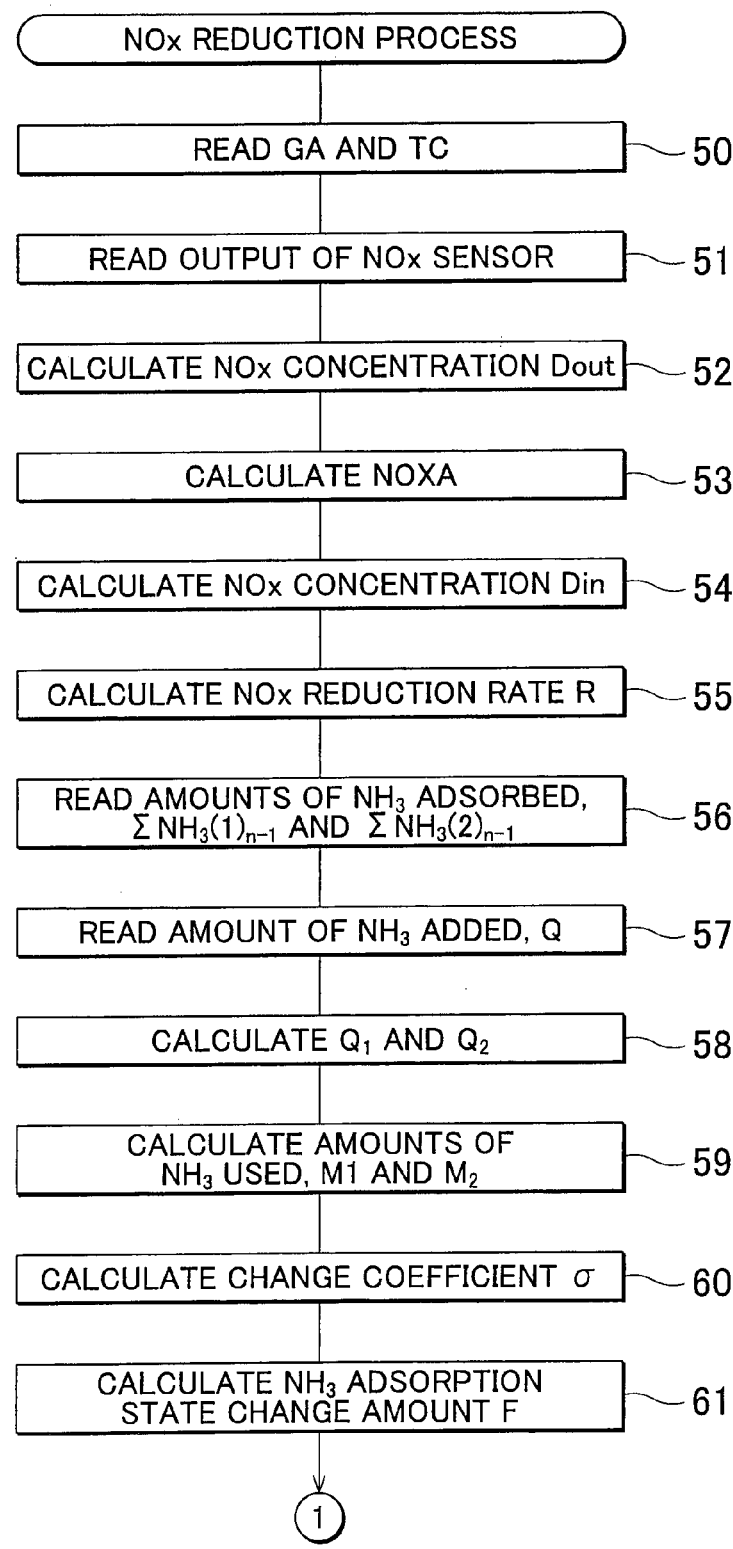
FIG. 5 shows a flow chart, based on which a NOx reduction process is performed.

Next, with reference to FIGS. 5 to 7, a NOx reduction process routine will be described. Note that the NOx reduction process routine is executed by interrupts at fixed intervals. Referring to FIG. 5, first, the intake air amount GA detected by the intake air amount detector 8 and the temperature TC of the NOx selective reduction catalyst 13 that is estimated from the detection signal of the temperature sensor 29 are read in step 50. Next, in step 51, the output of the NOx sensor 28 is read, and in step 52, the concentration Dout of NOx in the exhaust gas that flows out of the NOx selective reduction catalyst 13 is calculated based on the output of the NOx sensor 28.

Next, in step 53, the discharged NOx amount NOXA that is the amount of NOx discharged per unit time is calculated from the map shown in FIG. 4A. Next, in step 54, the concentration Din of NOx in the exhaust gas that flows into the NOx selective reduction catalyst 13 is calculated based on the discharged NOx amount NOXA and the intake air amount GA. Next, in step 55, the NOx reduction rate R (=(Din−Dout)/Din) is calculated.

Next, in step 56, the estimated value $\Sigma NH_3(1)_{n-1}$ of the amount of adsorbed ammonia that is in the first adsorption state and the estimated value $\Sigma NH_3(2)_{n-1}$ of the amount of adsorbed ammonia that is in the second adsorption state, which are calculated in the preceding interrupt, are read. Next, in step 57, the amount of addition Q of ammonia added within the period between the preceding interrupt and the current interrupt is read based on the amount of aqueous urea solution supplied. Next, in step 58, $N_1$ and $N_2$ are obtained from the relations shown in FIG. 4B and based on $N_1$ and N2, the amount of ammonia $Q_1$ (=$N_1 \cdot Q$) that is adsorbed in the first adsorption state and the amount of ammonia $Q_2$ (=N?·Q) that is adsorbed in the second adsorption state are calculated.

Next, in step 59, the consumption $M_1$ of the adsorbed ammonia that is in the first adsorption state and the consumption $M_2$ of the adsorbed ammonia that is in the second adsorption state are calculated. Specifically, the total consumption of the adsorbed ammonia that is the amount of the adsorbed ammonia that is consumed to reduce NOx within the period between the preceding calculation and the current calculation is calculated based on the NOx reduction rate R and the discharged NOx amount NOXA obtained from the map shown in FIG. 4A, the consumption $M_1$ of the adsorbed ammonia that is in the first adsorption state is calculated by multiplying the total consumption of the adsorbed ammonia by $\eta_1$, and the consumption $M_2$ of the adsorbed ammonia that is in the second adsorption state is calculated by multiplying the total consumption of the adsorbed ammonia by $\eta_2$.

Next, in step 60, the change coefficient σ is calculated from the relations shown in FIG. 4C, and in step 61, the change amount F (=$\sigma \cdot \Sigma NH_3(1)_{n-1}$) of the adsorbed ammonia that is the amount of adsorbed ammonia, the state of which changes from the first adsorption state to the second adsorption state, is calculated by multiplying the estimated value $\Sigma NH_3(1)_{n-1}$, calculated in the preceding calculation, of the amount of adsorbed ammonia that is in the first adsorption state by the change coefficient σ.

Next, in step 62, the estimated value $\Sigma NH_3(1)_n$ of the amount of adsorbed ammonia that is in the first adsorption state is calculated based on the following expression: $\Sigma NH_3(1)_n \leftarrow \Sigma NH_3(1)_{n-1} + Q_1 - M_1 - F$. Next, in step 63, the estimated value $\Sigma NH_3(2)_n$ of the amount of adsorbed ammonia that is in the second adsorption state is calculated based on the following expression: $\Sigma NH_3(2)_n \leftarrow \Sigma NH_3(2)_{n-1} + Q_2 - M_2 + F$. Next, in step 64, the sum of the estimated value $\Sigma NH_3(1)_n$ of the amount of adsorbed ammonia that is in the first adsorption state and the estimated value $\Sigma NH_3(2)_n$) of the amount of adsorbed ammonia that is in the second adsorption state is substituted for the total ammonia adsorption amount $\Sigma NH_3$ (=$\Sigma NH_3(1)_n + \Sigma NH_3(2)_n$).

Next, in step 65, the main target ammonia adsorption amount NX(1+2), the first target ammonia adsorption amount NX(1), and the second target ammonia adsorption amount NX(2) according to the catalyst temperature TC are calculated from the relations shown in FIG. 3. Next, in step 66, it is determined whether the total ammonia adsorption amount $\Sigma NH_3$ exceeds the main target ammonia adsorption amount NX(1+2). When a relation, $\Sigma NH_3 \leq NX(1+2)$, is satisfied, the process proceeds to step 67 and it is determined whether the estimated value $\Sigma NH_3(1)_n$ of the amount of adsorbed ammonia that is in the first adsorption state exceeds the first target ammonia adsorption amount NX(1). When a relation, $\Sigma NH_3(1) \leq NX(1)$, is satisfied, the process proceeds to step 68 and it is determined whether the estimated value $\Sigma NH_3(2)_n$ of the amount of adsorbed ammonia that is in the second adsorption state exceeds the second target ammonia adsorption amount NX(2). When a relation, $\Sigma NH_3(2)_n \leq NX(2)$, is satisfied, the process proceeds to step 69 and a predetermined amount, Q, of ammonia is added. In actuality, aqueous urea solution is supplied, the amount of which is such that the amount of ammonia becomes Q.

Specifically, the estimated values of the amount of adsorbed ammonia, $\Sigma NH_3(1)_n$ and $\Sigma NH_3(2)_n$, that is adsorbed when ammonia is added by the amount of addition Q are calculated, and the ammonia is added by the addition amount Q when the total ammonia adsorption amount $\Sigma NH_3$, which is the sum of the estimated values, does not exceed the main target ammonia adsorption amount NX(1+2), the estimated value $\Sigma NH_3(1)_n$ of the amount of adsorbed ammonia does not exceed the first target ammonia adsorption amount NX(1), and the estimated value $\Sigma NH_3(2)_n$ of the amount of adsorbed ammonia does not exceed the second target ammonia adsorption amount NX(2). When ammonia has been added by the addition amount Q, the process proceeds to step 70, $\Sigma NH_3(1)_n$ is substituted for $\Sigma NH_3(1)_{n-1}$, and in step 71, $\Sigma NH_3(2)_n$ is substituted for $\Sigma NH_3(2)_{n-1}$.

On the other hand, when it is determined in step 66 that a relation, $\Sigma NH_3 > NX(1+2)$, is satisfied, it is determined in step 67 that a relation, $\Sigma NH_3(1)_n > NX(1)$, is satisfied, or it is determined in step 68 that a relation, $\Sigma NH_3(2)_n > NX(2)$, is satisfied, the process proceeds to step 72 and the addition of ammonia is stopped. When the addition of ammonia is stopped, $Q_1$ and $Q_2$ become zero. Thus, in this case, the process proceeds to step 73 and the estimated value $\Sigma NH_3(1)_n$ of the amount of adsorbed ammonia that is in the first adsorption state is calculated using the following expression: $\Sigma NH_3(1)_n \leftarrow \Sigma NH_3(1)_{n-1} - M_1 - F$. Next, in step 74, the estimated value $\Sigma NH_3(2)_n$ of the amount of adsorbed ammonia that is in the second adsorption state is calculated using the following expression: $\Sigma NH_3(2)_n \leftarrow \Sigma NH_3(2)_{n-1} - M_2 + F$. The process then proceeds to step 70

As described above, in the embodiment of the invention, as long as the estimated value $\Sigma NH_3(1)_n$ of the amount of adsorbed ammonia that is in the first adsorption state is less than the first target ammonia adsorption amount NX(1) and the estimated value $\Sigma NH_3(2)_n$ of the amount of adsorbed ammonia that is in the second adsorption state is less than the second target ammonia adsorption amount NX(2), ammonia is added so that the total ammonia adsorption amount $\Sigma NH_3$ is brought to the main target ammonia adsorption amount NX(1+2). Even when the total ammonia adsorption amount $\Sigma NH_3$ has not reached the main target ammonia adsorption amount NX(1+2), the addition of ammonia, that is, the supply of aqueous urea solution is stopped when the estimated value $\Sigma NH_3(1)_n$ of the amount of adsorbed ammonia that is in the first adsorption state exceeds the first target ammonia adsorption amount NX(1), or the estimated value $\Sigma NH_3(2)_n$ of the amount of adsorbed ammonia that is in the second adsorption state exceeds the second target ammonia adsorption amount NX(2).

Next, an embodiment will be described, in which the total ammonia adsorption amount can be increased by actively changing the ammonia adsorption state from the first adsorption state to the second adsorption state. Specifically, as described above, when the temperature of the NOx selective reduction catalyst 13 increases, the ammonia adsorption state changes from the first adsorption state to the second adsorption state. Thus, in this embodiment, when the amount of ammonia that is in the first adsorption state increases and the amount of ammonia that is in the second adsorption state is small, that is, when there is a room for adsorbing further ammonia in the second adsorption state, the temperature of the NOx selective reduction catalyst 13 is increased and the adsorption state of the ammonia that is adsorbed in the first adsorption state is changed to the second adsorption state. This makes it possible to adsorb the ammonia in the first adsorption state, which in turn makes it possible to increase the amount of desorption of ammonia.

In other words, in this embodiment, the temperature of the NOx selective reduction catalyst 13 is increased to change the adsorption state of the ammonia that is in the first adsorption state to the second adsorption state when the estimated value of the amount of adsorbed ammonia that is in the first adsorption state approaches the first target ammonia adsorption amount NX(1) and exceeds a predetermined, first adsorption amount determination value and the estimated value of the amount of adsorbed ammonia that is in the second adsorption state is lower than a predetermined, second adsorption amount determination value. Specifically, the temperature of the NOx selective reduction catalyst 13 is increased to change the adsorption state of the ammonia that is in the first adsorption state to the second adsorption state when the estimated value $\Sigma NH_3(1)_n$ of the amount of adsorbed ammonia that is in the first adsorption state exceeds the first adsorption amount determination value (NX(1)-$\alpha$) that is lower than the first target ammonia adsorption amount NX(1) by a fixed amount a and the estimated value $\Sigma NH_3(2)_n$ of the amount of adsorbed ammonia that is in the second adsorption state is lower than the second adsorption amount determination value (NX(2)-$\beta$) that is lower than the second target ammonia adsorption amount NX(2) by a fixed amount $\beta$.

Figure 6:
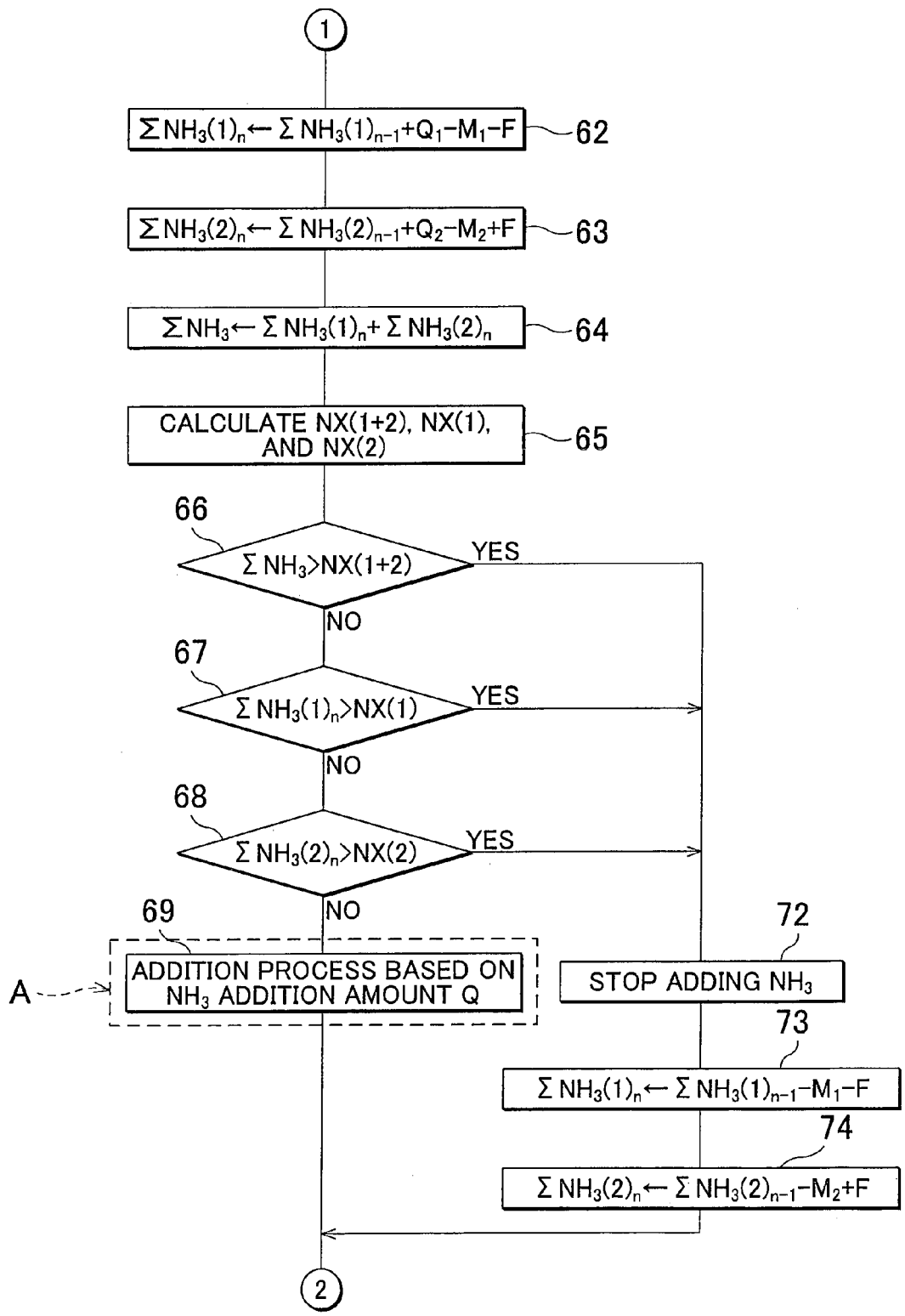
FIG. 6 shows the flow chart, based on which the NOx reduction process is performed.
Figure 7:
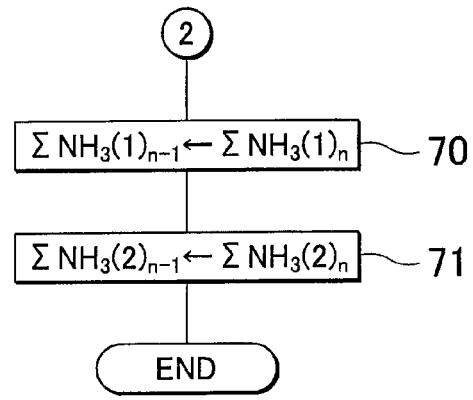
FIG. 7 shows the flow chart, based on which the NOx reduction process is performed.
Figure 8:
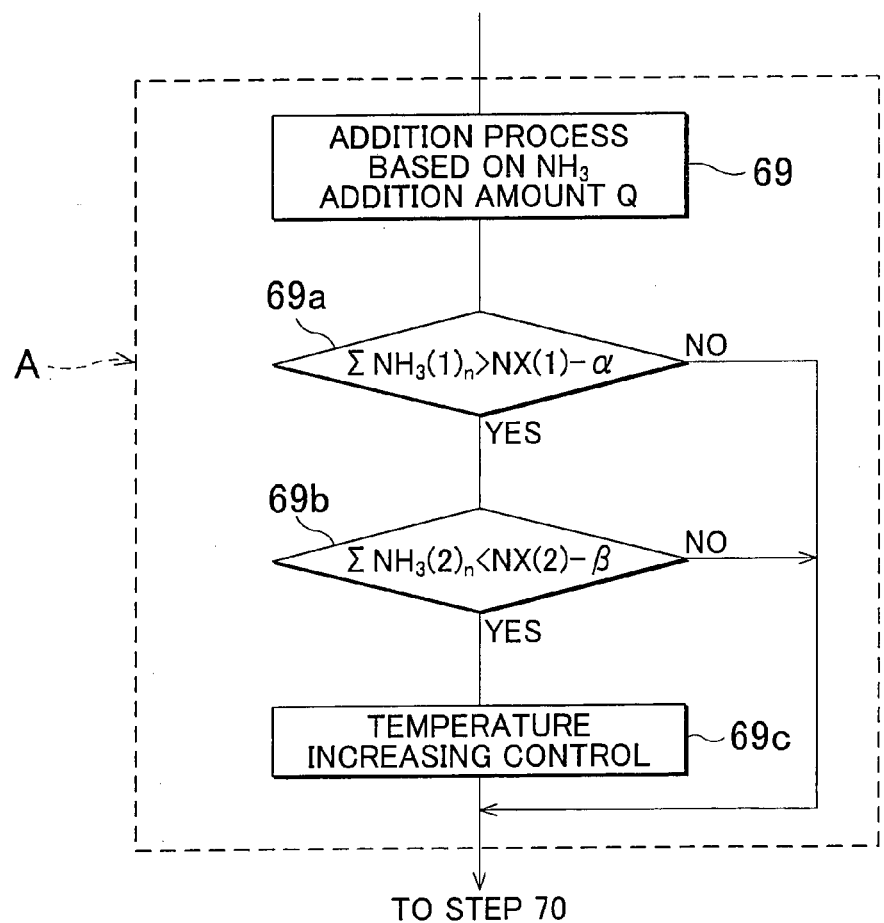
FIG. 8 shows part of a flow chart, based on which a NOx reduction process is performed.

The NOx reduction process according to this embodiment is implemented by replacing the part A surrounded by a broken line in FIG. 6 by the process shown in FIG. 8. Specifically, in this embodiment, as shown in FIG. 8, when the ammonia addition process in step 69 is completed, the process proceeds to step 69a and it is determined whether the estimated value $\Sigma NH_3(1)_n$ of the amount of adsorbed ammonia that is in the first adsorption state exceeds (NX(1)-$\alpha$). When a relation, $\Sigma NH_3(1)_n > NX(1)-\alpha$, is satisfied, the process proceeds to step 69b and it is determined whether the estimated value $\Sigma NH_3(2)_n$ of the amount of adsorbed ammonia that is in the second adsorption state is less than (NX(2)-$\beta$) When a relation, $\Sigma NH_3(2)_n < NX(2)\beta$, is satisfied, the process proceeds to step 69c and control for increasing the temperature of the NOx selective reduction catalyst 13 is performed. The temperature increasing control is performed by retarding the timing of fuel injection from the fuel injection valves 3 to increase the temperature of the exhaust gas, for example.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. An exhaust gas control apparatus for an internal combustion engine comprising:
   a NOx selective reduction catalyst disposed in an engine exhaust gas passage; and
   a supply device that supplies ammonia to the NOx selective reduction catalyst to cause the NOx selective reduction catalyst to adsorb the ammonia, wherein:
   the exhaust gas control apparatus is configured to selectively reduce NOx in exhaust gas using the ammonia adsorbed;
   the ammonia is adsorbed by the NOx selective reduction catalyst in at least two states, including:
      a first adsorption state of the ammonia that occurs if the ammonia is adsorbed by the NOx selective reduction catalyst while a temperature of the NOx selective reduction catalyst is in a lower side temperature range, and an amount of desorption of the ammonia in which state is maximized in the lower side temperature range as the temperature of the NOx selective reduction catalyst increases, and
      a second adsorption state of the ammonia that occurs if the ammonia is adsorbed or has already been adsorbed by the NOx selective reduction catalyst while the temperature of the NOx selective reduction catalyst is in a higher side temperature range higher than the lower side temperature range, and an amount of desorption of the ammonia in which state is maximized in the higher side temperature range as the temperature of the NOx selective reduction catalyst increases; and
   the exhaust gas control apparatus further includes a controller that estimates an amount of adsorbed ammonia that is in the first adsorption state to control the amount of adsorbed ammonia that is in the first adsorption state, and estimates an amount of adsorbed ammonia that is in the second adsorption state to control the amount of adsorbed ammonia that is in the second adsorption state, with the use of at least relations, stored in advance, between the temperature and a proportion of the amount of ammonia that is adsorbed in the first adsorption state and a proportion of the amount of ammonia that is adsorbed in the second adsorption state.

2. The exhaust gas control apparatus for an internal combustion engine according to claim 1, wherein:
   in order to control a first concentration, which is a concentration of the ammonia that is desorbed from the first adsorption state when the temperature of the NOx selective reduction catalyst increases, so as to be equal to or lower than a predetermined, first allowable concentration, the controller restricts the amount of adsorbed ammonia that is in the first adsorption state based on the estimated amount of adsorbed ammonia that is in the first adsorption state, and
   in order to control a second concentration, which is a concentration of the ammonia that is desorbed from the second adsorption state when the temperature of the NOx selective reduction catalyst increases, so as to be equal to or lower than a predetermined, second allowable concentration, the controller restricts the amount of adsorbed ammonia that is in the second adsorption state based on the estimated amount of adsorbed ammonia that is in the second adsorption state.

3. The exhaust gas control apparatus for an internal combustion engine according to claim 1, wherein:
a first concentration is a concentration of the ammonia that is desorbed from the first adsorption state when the temperature of the NOx selective reduction catalyst increases;
a second concentration is a concentration of the ammonia that is desorbed from the second adsorption state when the temperature of the NOx selective reduction catalyst increases;
a first target ammonia adsorption amount for controlling the first concentration so as to be equal to or lower than the predetermined, first allowable concentration, is set in advance;
a second target ammonia adsorption amount for controlling the second concentration so as to be equal to or lower than the predetermined, second allowable concentration, is set in advance; and
the controller controls an amount of supplied ammonia so that the amount of adsorbed ammonia that is in the first adsorption state is kept equal to or less than the first target ammonia adsorption amount and the amount of adsorbed ammonia that is in the second adsorption state is kept equal to or less than the second target ammonia adsorption amount.

4. The exhaust gas control apparatus for an internal combustion engine according to claim 3, wherein:
a main target ammonia adsorption amount for an entire amount of adsorbed ammonia that is in the first adsorption state or the second adsorption state is set in advance;
each of the first target ammonia adsorption amount and the second target ammonia adsorption amount is set to a value less than the main target ammonia adsorption amount at the same temperature of the NOx selective reduction catalyst; and
the controller controls the amount of supplied ammonia so that the entire amount of adsorbed ammonia is brought to the main target ammonia adsorption amount while keeping the amount of adsorbed ammonia that is in the first adsorption state equal to or less than the first target ammonia adsorption amount and keeping the amount of adsorbed ammonia that is in the second adsorption state equal to or less than the second target ammonia adsorption amount.

5. The exhaust gas control apparatus for an internal combustion engine according to claim 4, wherein the controller increases the temperature of the NOx selective reduction catalyst to change the adsorption state of the ammonia that is in the first adsorption state to the second adsorption state when an estimated value of the amount of adsorbed ammonia that is in the first adsorption state approaches the first target ammonia adsorption amount and exceeds a predetermined, first adsorption amount determination value and an estimated value of the amount of adsorbed ammonia that is in the second adsorption state is lower than a predetermined, second adsorption amount determination value.

6. The exhaust gas control apparatus for an internal combustion engine according to claim 1, wherein the controller calculates a consumption of the adsorbed ammonia that is an amount of adsorbed ammonia that is consumed to reduce NOx when the amount of adsorbed ammonia that is in the first adsorption state and the amount of adsorbed ammonia that is in the second adsorption state are estimated.

7. The exhaust gas control apparatus for an internal combustion engine according to claim 1, wherein the controller estimates a change amount of adsorbed ammonia that is an amount of adsorbed ammonia, the adsorption state of which changes from the first adsorption state to the second adsorption state when the temperature of the NOx selective reduction catalyst increases, and based on an estimated value of the change amount of adsorbed ammonia, and corrects both an estimated value of the amount of adsorbed ammonia that is in the first adsorption state and an estimated value of the amount of adsorbed ammonia that is in the second adsorption state.

8. The exhaust gas control apparatus for an internal combustion engine according to claim 1, wherein the controller estimates the amount of adsorbed ammonia that is in the first adsorption state and the amount of adsorbed ammonia that is in the second adsorption state based on an amount of ammonia supplied to the NOx selective reduction catalyst, a NOx reduction rate of the NOx selective reduction catalyst, and the temperature of the NOx selective reduction catalyst.

9. A method of controlling exhaust gas of an internal combustion engine, comprising:
supplying ammonia to a NOx selective reduction catalyst, disposed in an engine exhaust gas passage, to cause the NOx selective reduction catalyst to adsorb the ammonia; and
selectively reducing NOx in exhaust gas using the ammonia adsorbed,
wherein the ammonia is adsorbed by the NOx selective reduction catalyst in at least two states, including:
a first adsorption state of the ammonia that occurs if the ammonia is adsorbed by the NOx selective reduction catalyst while a temperature of the NOx selective reduction catalyst is in a lower side temperature range, and an amount of desorption of the ammonia in which state is maximized in the lower side temperature range as the temperature of the NOx selective reduction catalyst increases, and
a second adsorption state of the ammonia that occurs if the ammonia is adsorbed or has already been adsorbed by the NOx selective reduction catalyst while the temperature of the NOx selective reduction catalyst is in a higher side temperature range higher than the lower side temperature range, and an amount of desorption of the ammonia in which state is maximized in the higher side temperature range as the temperature of the NOx selective reduction catalyst increases, and
the method further comprises:
estimating an amount of adsorbed ammonia that is in the first adsorption state;
estimating an amount of adsorbed ammonia that is in the second adsorption state; and
controlling the amount of adsorbed ammonia that is in the first adsorption state and the second adsorption state based on the estimated amount of adsorbed ammonia that is in the first and second adsorption state, respectively, with the use of at least relations, stored in advance, between the temperature and a proportion of the amount of ammonia that is adsorbed in the first adsorption state and a proportion of the amount of ammonia that is adsorbed in the second adsorption state.

* * * * *